June 16, 1936.  C. G. TRIMBACH  2,044,340
GUN INSTALLATION AND FIRING MEANS
Filed Nov. 17, 1933   2 Sheets-Sheet 2
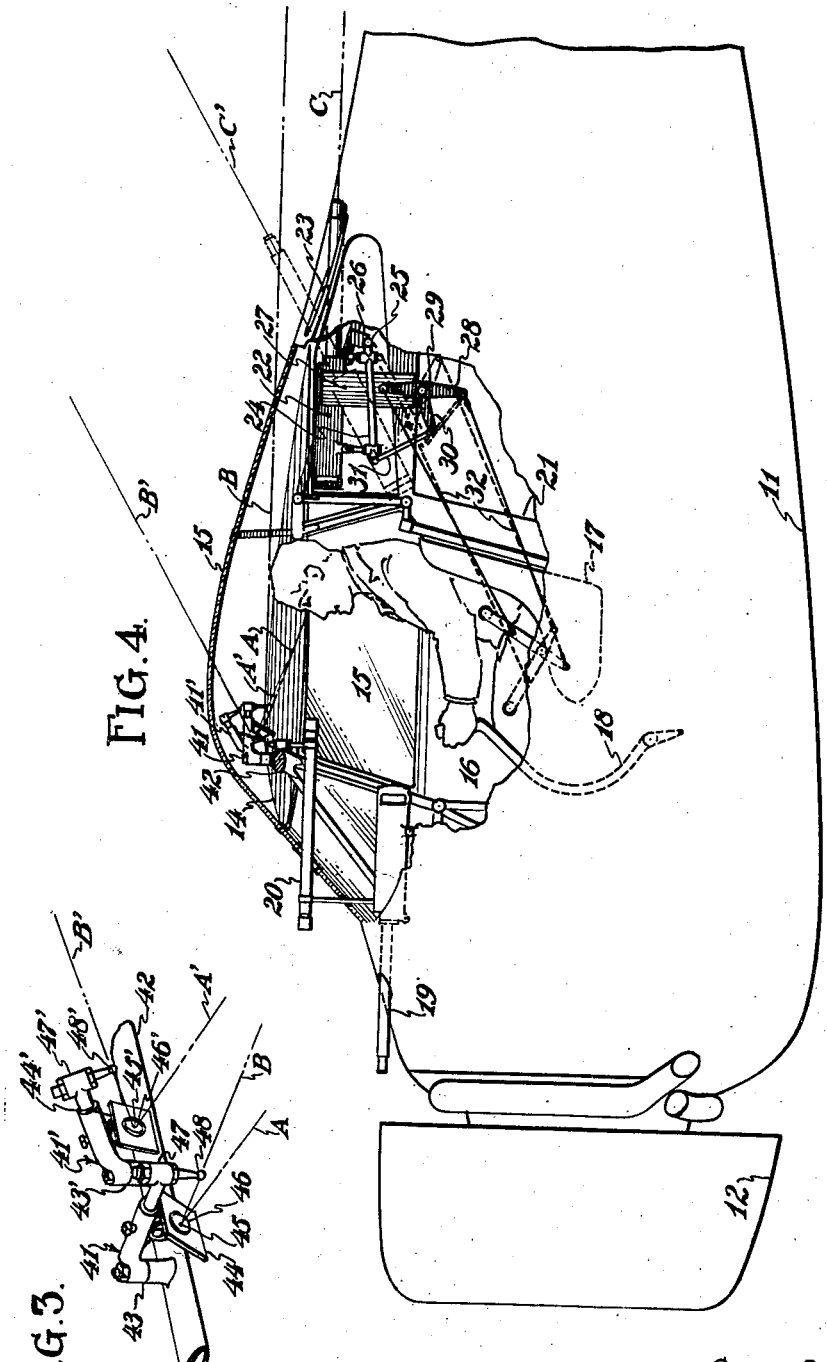
INVENTOR.
CLEM G. TRIMBACH.
BY
ATTORNEY Patented June 16, 1936

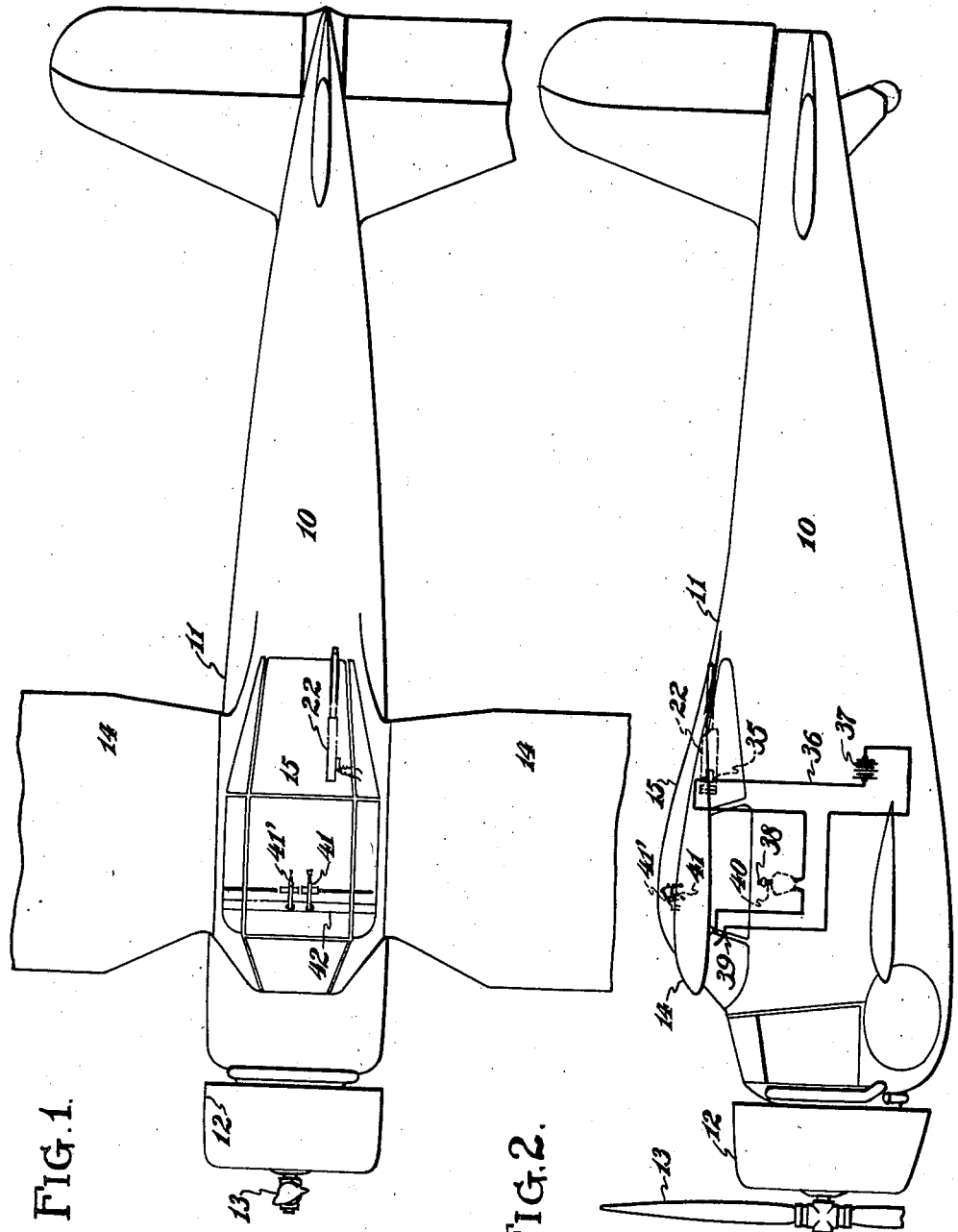

2,044,340

UNITED STATES PATENT OFFICE 2,044,340

GUN INSTALLATION AND FIRING MEANS

Clem G. Trimbach, Kenmore, N. Y., assignor to Curtiss Aeroplane & Motor Company, Inc., a corporation of New York Application November 17, 1933, Serial No. 698,455

3 Claims. (Cl. 89—37)

This invention relates to aircraft armament, and has for a particular object the provision of an improved mounting and sighting means for machine guns.

In aircraft of the pursuit type, arranged for the accommodation of a single person, such person acts both as pilot and gunner. In the past, aircraft of this type have been provided with one or more forwardly pointing machine guns fixed rigidly to the aircraft and aiming forwardly and substantially parallel to the line of flight of the aircraft. Aiming of the gun is effected by changing the attitude of the airplane as a whole, and firing of the gun is accomplished by a remote control trigger mechanism usually attached to the aircraft control stick. In the tactical maneuvering of aircraft of this type, it is obviously necessary to aim the whole airplane, and the pilot may sometimes find himself in embarrassing positions with respect to following enemy aircraft—the enemy craft may dive from behind and above, firing on the unprotected rearward portion of the airplane. The pilot thus must quickly maneuver his craft into a position out of the enemy's line of fire and to a position where he may return such fire. It thus becomes evident that the pilot of the single place aircraft may have a far greater degree of protection and ability for offensive fighting if his aircraft be provided with a rearwardly pointing gun, though obviously, the pilot of a single place aircraft cannot operate a rearwardly firing flexible gun such as is used in two place fighting aircraft. This invention provides a rearwardly pointing semi-fixed machine gun and sighting means therefor, which nay be used by the pilot when occupying his normally forward facing position. More specifically, I provide a machine gun having two alternative firing positions relative to the aircraft, one such position being directly aft and substantially parallel to the direction of flight of the aircraft, and the other position enabling the gun to fire rearwardly but at an angle above the flight axis of the aircraft. Means are provided convenient to the pilot for quickly shifting the gun from one to the other firing position. For sighting the rearwardly pointing gun, a reflecting mirror for each firing position is attached to a rigid and relatively non-vibrative structural part of the aircraft, forward of and preferably slightly above the normal position of the pilot's eyes. One reflector is adjusted to indicate the aiming point of the gun when in its lower position, and the other mirror is angularly adjusted to indicate the aiming point of the gun when in its elevated position. To truly sight toward the aiming point of the gun, each reflector is provided with a datum point which might be formed as the equivalent of the normal peep-sight, and a bead, supported by a suitable bracket, is adjusted to lie in a line with the datum point and parallel to the actual line of fire of the gun. With this arrangement, the pilot may fire rearwardly, or rearwardly and upwardly, and is not burdened with a plurality of extra controls to interfere with the normal operation of the aircraft. The only extra controls necessary are the trigger mechanism for the rear gun and a shift lever for changing the position of elevation of the rear gun. Obviously, the gun might be wholly fixed in one rearwardly pointing attitude, and only one rearward sighting means would thus be provided.

Further advantages and objectives of the invention will be appreciated by an examination of the drawings and by a consideration of the claims and the following description.

In the drawings:

Fig. 1 is a plan of an airplane showing diagrammatically the arrangement of the component parts of my invention;

Fig. 2 is a side elevation showing my invention in diagrammatic form and also showing electrical connections for an electrically operated remote trigger mechanism;

Fig. 3 is a detailed perspective of the gun sights; and

Fig. 4 is a fragmentary side elevation showing the details and arrangement of the several components of the invention.

The airplane 10 is of that type having a fuselage 11 with a forwardly located engine 12 and propeller 13. The upper wing 14, as is more clearly shown in Fig. 4, is located substantially on a level with the eyes of the pilot, and a transparent cockpit enclosure 15 completely encloses the pilot and enables him to have a wide sphere of vision. The cockpit 16 is provided with the usual seat 17 and control stick 18. As is conventional for an aircraft of this type, a forwardly pointing fixed gun 19 is mounted to fire between the blades of the propeller, and a telescope sight 20 is mounted on a level with the pilot's eyes to enable the pilot to aim the aircraft at a target for accurate forward gun fire. Within the fuselage and rearwardly of the seat 17, may be conveniently located a fuel tank 21 above which is mounted a rearwardly pointing machine gun 22. The muzzle of this gun projects through a suitable aperture 23 in the aircraft covering. The gun is carried in an adapter 24, pivoted at its rearward end 25 to a gun mounting bracket 26 fixed to the aircraft. Spaced parallel guides 27 embrace the sides of the machine gun to hold it in alignment as the gun may be elevated or depressed. A bell crank 28 is pivoted at 29 to the aircraft structure, one arm 30 of said crank being connected by a link 31 to the forward end of the gun adapter 24. Cables 32 extend from the other arms of the bell crank 28, forwardly to an operating handle 33 pivoted adjacent the seat 17. It will thus be apparent that by moving the handle 33, the bell crank is likewise swung about its pivot by the action of the cables 32, thus depressing or elevating the link 31, the gun adapter 24 and the gun 22, according to the direction in which said handle 33 is moved. Stops for limiting the extreme gun positions may readily be installed, so that the lower and upper gun positions are positive and determinate. Most conveniently, the handle 33 is arranged to be moved forwardly to elevate the gun above the aircraft, and rearwardly to lower the gun to a direct rearwardly firing attitude.

As shown in Fig. 2, a solenoid trigger mechanism 35 is connected in series in a circuit 36 containing respectively a battery or other source of power 37, a service trigger switch 38, and a safety switch 39. The trigger switch 38 may conveniently be coordinated with the engine throttle lever 40. Since the pilot's right hand is always on the control stick, the forward gun trigger is mounted thereon. His left hand is usually on, or habitually moves toward the throttle lever, so the rear gun trigger is placed in an instinctive position on the throttle lever.

For ascertaining the aiming point of the rear gun, sighting devices 41 and 41' are fixed to a suitable structural member 42 located forward of and above the pilot's eyes. This member 42 might logically be the forward wing spar extension which passes through the cockpit 16, and the member 42 should be so chosen or designed, as to have a minimum amount of vibration. The sighting devices 41 and 41' are substantially identical in their structural details. The device 41 is shown as being arranged for ascertaining the aiming point of the rear gun 22 when it is in its depressed attitude, parallel to the flight axis of the aircraft, the device 41' being adjusted for ascertainment of the aiming point of the gun 22 when it is in its elevated attitude. Each sighting device includes a bracket 43 extending rearwardly from the structural member 42 and having an adjustably mounted reflecting mirror 44 thereon. The mirror 44 is arranged for universal adjustment, and has marked thereon a datum point 45 surrounded by a circle 46. The circle 46 corresponds to the peep-sight of a normal gun sight. Extending rearwardly from the bracket 43 is an adjustable arm 47 carrying at its rearward end an adjustably mounted bead 48. The bead 48, by the adjustments thus provided, may be elevated or lowered with respect to the bracket 43, and may be also moved forwardly and rearwardly with respect thereto.

The proper adjustment for the sighting device will be attained when a line of sight A, reflecting at the datum point 45, and passing through the bead 48, will form a line of sight B, which line B is parallel with the line of fire C of the gun 22 when in its depressed position. In the sighting device 41', the line of sight A' will be reflected from the datum point 45' to pass through the bead 48' to form a line of sight B', parallel to the line of fire C' of the gun 22 when in its elevated position. Due to the spacing of the respective lines of sight and lines of fire, compensating adjustments may be made in the sighting devices 41 and 41' to effect a convergence of the lines B and C, and B' and C', at any desired distance from the aircraft. This coincidence of the lines of fire and the lines of sight would be made at a range, which by experience, would be the most frequent range at which the gun might be used. Similar adjustments, of course, are provided for all fixed gun installations.

The reflectors 44 and 44' may in themselves be made of sufficient size, or may possibly be made in convex shape, so that a relatively wide sector of visibility is afforded to the pilot. By the use of one or the other reflectors, he may quickly determine whether he is being followed directly from the rear or from above, and may change his direction of flight accordingly to bring the following enemy within the line of fire of his rear gun. Should an enemy appear ahead of him, he can quickly and immediately go into action without changing or adjusting his position, and may readily fire either or both the forward and rearward guns at will.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft, a gun mounted for two fixed lines of fire, both said lines of fire being divergent from the forward line of flight of said aircraft, means operable to shift said gun to one or the other of said lines of fire, and sighting means operable by a member of the aircraft crew for reflecting either aiming point of said gun into the eyes of a member of the aircraft crew, the line of vision from the eyes extending forwardly to said sighting means substantially in the same direction of flight of said aircraft.

2. In aircraft, a forwardly facing pilot seat, a mount for a gun having two semi-fixed attitudes for holding said gun for angularly divergent lines of fire, means operable by the pilot and adjacent said seat for shifting said mount to either of the indicated attitudes, and sighting means fixedly carried by said aircraft and situated forwardly of and substantially level with the eyes of the pilot whereby said pilot may ascertain the aiming point of said gun in either of its attitudes.

3. In aircraft, a forwardly facing crew seat, a gun rearwardly of said seat and organized for rearward firing, a carriage holding said gun and pivoted on a lateral axis with respect to said aircraft, means for swinging said gun and carriage to point said gun substantially parallel to the line of flight of the aircraft or to point said gun in an angular attitude with respect to the line of flight, said means being operable by the pilot and being positioned proximate to said seat, and means operable by the forwardly facing crew for ascertaining the aiming point of the rearwardly pointing gun.

CLEM G. TRIMBACH.